GARET. HEERMANCE'S
Seat Fastening Device

No. 121,519.   Patented Dec. 5, 1871.

Witnesses
John V. Whitbeck
Jordan Philip

Inventor
Garet G. Heermance

UNITED STATES PATENT OFFICE.

GARET G. HEERMANCE, OF CLAVERACK, NEW YORK.

IMPROVEMENT IN DEVICES FOR FASTENING WAGON-SEATS.

Specification forming part of Letters Patent No. 121,519, dated December 5, 1871; antedated November 25, 1871.

*To all whom it may concern:*

Be it known that I, GARET G. HEERMANCE, of the town of Claverack, in the county of Columbia and State of New York, have invented a certain Improvement in the Devices of Fastening a Seat of a Wagon or any seat, of which the following is a specification:

The first part of my invention relates to the combination of a pin driven diagonally with a pin driven perpendicularly into each bottom end of a seat of a wagon or any seat, or its bottom end blocks, and having the said pins enter into their corresponding holes, somewhat larger in the seat-raves or support of said seat, in order to fasten said seat against its horizontal movement. The second part of my invention relates to the combination of the said pins with movable hooks fastened to each bottom end of the said seat or bottom end blocks, and hooking into staples or lugs driven into the seat-raves or support of said seat to fasten it against its upward movement.

Figure 1:
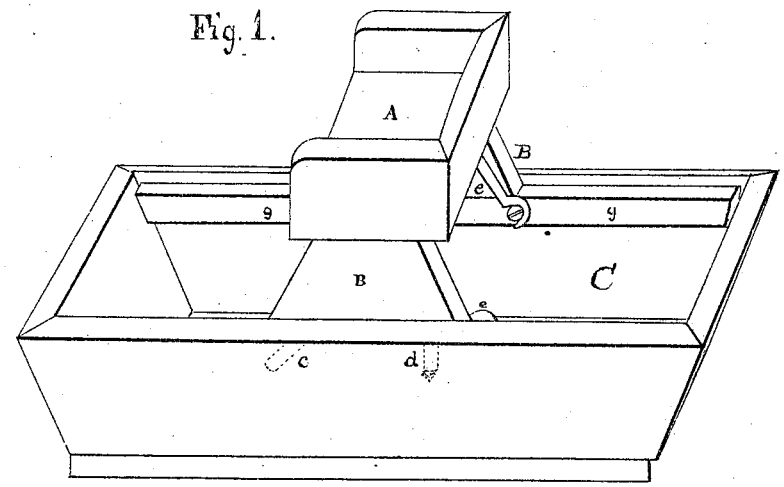
Figure 2:
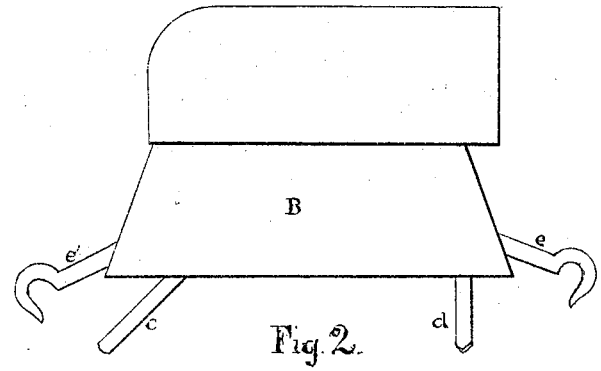

Figure 1 is a side elevation of a wagon-box with a seat fastened permanently on end blocks and with seat-raves or support, embodying my invention. Fig. 2 is an end view of said seat A removed, showing one of the said end blocks B, one of the diagonal pins $c$, one of the said perpendicular pins $d$, one of the movable front hooks $e'$, and one of back hooks $e$, thus showing so much of my invention.

Fig. 1, C is a wagon-box. A is its seat; B B, the end blocks of said seat; $g\ g$, one of its seat-raves or rails; $c$, one of the said diagonal pins; $d$, one of the said perpendicular pins; $e'\ e$, the two movable hooks on the rear and front of the said end blocks.

I drive a pin diagonally, like pin $c$, Fig. 1, into each bottom end of said seat A, Fig. 1, or its end seat-blocks B B, Fig. 1, at any angle less than a right angle, and then bore their corresponding holes somewhat larger in each seat-rave or rail $g\ g$, Fig. 1, or any other support. I drive a pin perpendicularly, like pin $d$, Fig. 1, into each bottom end of said seat A, Fig. 1, or its end seat-blocks B B, Fig. 1, and then bore their corresponding holes somewhat larger in each seat-rave or rail $g\ g$, Fig. 1, or any other support. I let the said pins project perpendicularly about one and a half inch, more or less, below the bottom of the said seat or its blocks, and the others project diagonally about half an inch further. I make the said pins of any diameter desired. The said movable hooks $e\ e$, Fig. 1, fasten to the bottom ends of the said seat A, Fig. 1, or its end seat-blocks B B, Fig. 1, in the rear and front by staples or screws passing through their eyes, and then hook them into staples or lugs driven into each seat-rave or rail $g\ g$, Fig. 1, or any other support. I sometimes use spring-hooks instead of the said movable hooks, when desired.

When I wish to remove a seat fastened by my device I unhook the hooks and raise the edge of the seat opposite the diagonal pins first.

I claim as my invention—

The combination of the pins $c$ and $d$ in the seat and the hooks $e'$ and $e$ upon the seat and staples, or pins upon the wagon or sleigh-body, for the purpose of securing the seat to the wagon or sleigh-body, substantially as described herein and set forth.

GARET G. HEERMANCE.

Witnesses:
 JOHN V. WHITBECK,
 JORDAN PHILIP. (31)